US008731977B1

(12) United States Patent
Hardin et al.

(10) Patent No.: US 8,731,977 B1
(45) Date of Patent: May 20, 2014

(54) SYSTEM AND METHOD FOR ANALYZING AND USING VEHICLE HISTORICAL DATA

(71) Applicants: Chris Michael Hardin, Advance, NC (US); John Wayne McElrath, Cleveland, AL (US); Tommy Steven DeMedicis, Birmingham, AL (US); Robert David Solomonic, Advance, NC (US)

(72) Inventors: Chris Michael Hardin, Advance, NC (US); John Wayne McElrath, Cleveland, AL (US); Tommy Steven DeMedicis, Birmingham, AL (US); Robert David Solomonic, Advance, NC (US)

(73) Assignee: Red Mountain Technologies, LLC, Birmingham, AL (US)

( * ) Notice: Subject to any disclaimer, the term of this patent is extended or adjusted under 35 U.S.C. 154(b) by 0 days.

(21) Appl. No.: 13/835,349

(22) Filed: Mar. 15, 2013

(51) Int. Cl.
*G06Q 40/00* (2012.01)
*G01C 22/00* (2006.01)
*G05D 1/00* (2006.01)
*G01M 17/00* (2006.01)
*G06F 7/00* (2006.01)
*G06F 19/00* (2011.01)

(52) U.S. Cl.
USPC ............ 705/4; 701/482; 705/26.1; 705/26.61

(58) Field of Classification Search
None
See application file for complete search history.

(56) References Cited

U.S. PATENT DOCUMENTS

| | | | |
|---|---|---|---|
| 6,262,657 B1* | 7/2001 | Okuda et al. .................. 340/439 |
| 6,498,976 B1* | 12/2002 | Ehlbeck et al. ................. 701/70 |
| 6,611,755 B1* | 8/2003 | Coffee et al. ................. 701/482 |
| 7,747,415 B1* | 6/2010 | Churchill et al. ............. 702/187 |
| 7,778,841 B1* | 8/2010 | Bayer et al. ................... 705/306 |
| 8,140,358 B1* | 3/2012 | Ling et al. .......................... 705/4 |
| 8,255,243 B2* | 8/2012 | Raines et al. ..................... 705/4 |
| 8,255,244 B2* | 8/2012 | Raines et al. ..................... 705/4 |
| 8,311,858 B2* | 11/2012 | Everett et al. ..................... 705/4 |
| 8,549,028 B1* | 10/2013 | Alon et al. ..................... 707/769 |
| 8,606,648 B1* | 12/2013 | Bayer et al. ................ 705/26.61 |
| 8,655,579 B2* | 2/2014 | Sakugawa et al. ............ 701/301 |
| 2002/0091550 A1* | 7/2002 | White et al. ...................... 705/4 |
| 2002/0091706 A1* | 7/2002 | Anderson et al. .......... 707/104.1 |
| 2003/0055783 A1* | 3/2003 | Cataline et al. ................ 705/40 |
| 2004/0039504 A1* | 2/2004 | Coffee et al. ................... 701/35 |
| 2004/0039597 A1* | 2/2004 | Barts et al. ........................ 705/1 |
| 2004/0153362 A1* | 8/2004 | Bauer et al. ..................... 705/10 |
| 2004/0215474 A1* | 10/2004 | Nelson et al. ..................... 705/1 |
| 2005/0038580 A1* | 2/2005 | Seim et al. ...................... 701/29 |
| 2005/0080606 A1* | 4/2005 | Ampunan et al. ................ 703/8 |
| 2005/0143883 A1* | 6/2005 | Yamagiwa ...................... 701/32 |
| 2006/0025925 A1* | 2/2006 | Fushiki et al. ................ 701/210 |
| 2006/0074790 A1* | 4/2006 | Anspach ......................... 705/35 |

(Continued)

*Primary Examiner* — Gregory Johnson
(74) *Attorney, Agent, or Firm* — David E. Mixon; Stephen H. Hall; Bradley Arant Boult & Cummings LLP

(57) ABSTRACT

A system and method for analyzing and using vehicle historical data is provided. The system and method may include obtaining vehicle history data from a vehicle history data system, and analyzing various vehicle variables to determine final factors associated with such vehicle variables. The vehicle variables may be categorized based on the age of the vehicle, the amount of time that has occurred since some event, or other time period. The final factors can be combined to score particular vehicles. Vehicle history scores can be used to evaluate risk associated with a particular vehicle, including use in underwriting and rating insurance policies, vehicle financing, or vehicle warranties.

19 Claims, 8 Drawing Sheets

(56) References Cited

U.S. PATENT DOCUMENTS

| | | | |
|---|---|---|---|
| 2006/0142913 A1* | 6/2006 | Coffee et al. | 701/35 |
| 2006/0143071 A1* | 6/2006 | Hofmann | 705/10 |
| 2007/0027726 A1* | 2/2007 | Warren et al. | 705/4 |
| 2007/0040365 A1* | 2/2007 | Asada | 280/735 |
| 2007/0124046 A1* | 5/2007 | Ayoub et al. | 701/36 |
| 2007/0124599 A1* | 5/2007 | Morita et al. | 713/186 |
| 2007/0208600 A1* | 9/2007 | Babus et al. | 705/7 |
| 2008/0046383 A1* | 2/2008 | Hirtenstein et al. | 705/400 |
| 2008/0052216 A1* | 2/2008 | Johnson et al. | 705/37 |
| 2008/0103785 A1* | 5/2008 | Logan | 705/1 |
| 2008/0122603 A1* | 5/2008 | Plante et al. | 340/439 |
| 2008/0147267 A1* | 6/2008 | Plante et al. | 701/35 |
| 2008/0211647 A1* | 9/2008 | Yamada | 340/438 |
| 2008/0294302 A1* | 11/2008 | Basir | 701/2 |
| 2008/0312969 A1* | 12/2008 | Raines et al. | 705/4 |
| 2009/0099975 A1* | 4/2009 | Torre et al. | 705/36 R |
| 2009/0181640 A1* | 7/2009 | Jones | 455/404.2 |
| 2010/0030586 A1* | 2/2010 | Taylor et al. | 705/4 |
| 2010/0063850 A1* | 3/2010 | Daniel | 705/4 |
| 2010/0070382 A1* | 3/2010 | Inghelbrecht et al. | 705/27 |
| 2010/0094664 A1* | 4/2010 | Bush et al. | 705/4 |
| 2010/0094910 A1* | 4/2010 | Bayliss | 707/800 |
| 2010/0325144 A1* | 12/2010 | Fischer et al. | 707/769 |
| 2011/0063099 A1* | 3/2011 | Miller et al. | 340/439 |
| 2011/0082720 A1* | 4/2011 | Swinson et al. | 705/7.35 |
| 2011/0082759 A1* | 4/2011 | Swinson et al. | 705/26.1 |
| 2011/0119158 A1* | 5/2011 | Gladstone | 705/27.1 |
| 2011/0166893 A1* | 7/2011 | McConnell et al. | 705/4 |
| 2011/0184789 A1* | 7/2011 | Kirsch | 705/14.1 |
| 2011/0213628 A1* | 9/2011 | Peak et al. | 705/4 |
| 2011/0270635 A1* | 11/2011 | Raines et al. | 705/4 |
| 2011/0270636 A1* | 11/2011 | Raines et al. | 705/4 |
| 2011/0270706 A1* | 11/2011 | Anspach et al. | 705/26.61 |
| 2012/0021386 A1* | 1/2012 | Anderson et al. | 434/66 |
| 2012/0296549 A1* | 11/2012 | Adams | 701/102 |
| 2012/0330541 A1* | 12/2012 | Sakugawa et al. | 701/301 |
| 2013/0018677 A1* | 1/2013 | Chevrette | 705/4 |
| 2013/0073321 A1* | 3/2013 | Hofmann et al. | 705/4 |
| 2013/0090821 A1* | 4/2013 | Abboud et al. | 701/70 |
| 2013/0131968 A1* | 5/2013 | Wills | 701/117 |
| 2013/0173453 A1* | 7/2013 | Raines et al. | 705/38 |
| 2013/0201316 A1* | 8/2013 | Binder et al. | 348/77 |
| 2013/0226441 A1* | 8/2013 | Horita | 701/118 |

\* cited by examiner

| VIN 115 | Body Style 120 | Class 125 | Country 130 | Engine 135 | Mfg 140 | Model 145 | Event Code 1 15a | | |
|---|---|---|---|---|---|---|---|---|---|
| | | | | | | | | | |
| | | | | | | | | | |

{ 117 }

110

| Event Code 1 Date 25a | Event Code 2 15b | Event Code 2 Date 25b | Odometer Reading Record 1 30 | Odometer Reading Record 1 Date 35 |
|---|---|---|---|---|
| | | | | |
| | | | | |

Figure 2

| Variable | Variable Level | Preferred Final Factor Range | Preferred Final Factor |
|---|---|---|---|
| Failed Inspection | no | 1.00 | 1.00 |
| | yes and 0-6 years | 1.15 – 1.35 | 1.27 |
| | yes and 7+ | 0.95 – 1.10 | 1.04 |
| Fleet Designation | no | 1.00 | 1.00 |
| | yes and 0-3 years old | 0.99 – 1.10 | 1.01 |
| | yes and 4-6 years old | 1.00 – 1.11 | 1.02 |
| | yes and 7-12 years old | 0.97 – 1.05 | 0.99 |
| | yes and 13+ years old | 0.87 – 0.99 | 0.91 |
| Minor accident/miscellaneous | no | 1.00 | 1.00 |
| | yes and <00m-06months since last occurrence | 1.35 – 1.55 | 1.47 |
| | yes and <07m-01year since last occurrence | 1.25 – 1.45 | 1.36 |
| | yes and <01y-02years since last occurrence | 1.10 – 1.30 | 1.24 |
| | yes and <02y-03years since last occurrence | 1.05 – 1.25 | 1.21 |
| | yes and <03+ years since last occurrence | 1.00 – 1.20 | 1.13 |
| Most recent odometer reading and age of vehicle | 0-2 years under 25K miles | 0.85 – 0.95 | 0.88 |
| | 0-2 years 25-50K miles | 0.95 – 1.05 | 0.97 |
| | 0-2 years over 50K+ miles | 1.05 – 1.15 | 1.07 |
| | 3-5 years under 25K miles | 0.89 – 0.99 | 0.91 |
| | 3-5 years 25-50K miles | 0.95 – 1.05 | 0.97 |
| | 3-5 years 50-75K miles | 0.99 – 1.09 | 1.01 |
| | 3-5 years 75-100K miles | 1.01 – 1.11 | 1.03 |
| | 3-5 years over 100K miles | 1.06 – 1.16 | 1.08 |
| | 6-8 years under 25K miles | 0.92 – 1.02 | 0.94 |
| | 6-8 years 25-100K miles | 0.96 – 1.06 | 0.98 |
| | 6-8 years 100K+ miles | 1.03 – 1.13 | 1.05 |
| | 9-11 years under 25K miles | 0.85 – 0.95 | 0.89 |
| | 9-11 years 25-50K miles | 0.93 – 1.03 | 0.95 |
| | 9-11 years 50-75K miles | 0.97 – 1.07 | 0.99 |
| | 9-11 years 75-100K miles | 1.03 – 1.13 | 1.05 |
| | 9-11 years 100K+ miles | 1.04 – 1.14 | 1.06 |
| | 12-14 years under 25K miles | 0.80 – 0.90 | 0.83 |
| | 12-14 years 25-50K miles | 0.95 – 1.05 | 0.97 |
| | 12-14 years 50-75K miles | 0.97 – 1.07 | 0.99 |
| | 12-14 years over 100K miles | 1.05 – 1.15 | 1.08 |
| | 15+ years under 25K miles | 0.89 – 0.99 | 0.91 |
| | 15+ years 25-50K miles | 0.92 – 1.02 | 0.94 |
| | 15+ years 50-75K miles | 0.94 – 1.04 | 0.96 |
| | 15+ years over 100K miles | 0.95 – 1.05 | 0.97 |
| | 99>na | 1.00 | |

FIGURE 3

| Variable | Variable Level | Preferred Final Factor Range | Preferred Final Factor |
|---|---|---|---|
| Time since most recent odometer reading; broken down by age of vehicle and time since most recent reading | 0-5 years of age; reading 1-2 years ago | 1.00 | |
| | 6-9 years of age; reading more than 3 years ago | 0.90 – 1.05 | 0.99 |
| | 10-12 years of age; reading less than 1 year ago | 1.02 – 1.17 | 1.11 |
| | 10-12 years of age; reading 1-2 years ago | 0.94 – 1.09 | 1.03 |
| | 10-12 years of age; reading more than 3 years ago | 0.92 – 1.07 | 1.01 |
| | 13+ years of age; reading less than 1 year ago | 1.01 – 1.16 | 1.10 |
| | 13+ years of age; reading 1-2 years ago | 1.00 – 1.15 | 1.09 |
| | 13+ years of age; reading 2-3 years ago | 0.97 – 1.12 | 1.06 |
| | 13+ years of age; reading more than 3 years ago | 0.95 – 1.10 | 1.04 |
| | 99>ma | 1.00 | |
| rental | no | 1.00 | |
| | yes | 0.92 – 1.01 | 0.95 |
| repo | no | 1.00 | |
| | yes | 1.08 – 1.20 | 1.16 |
| Salvage – broken down by age of vehicle and time since designation | no | 1.00 | |
| | 0-3 years old; designation less than 3 years ago | 1.35 – 1.55 | 1.43 |
| | 0-3 years old; designation more than 3 years ago | 1.01 – 1.20 | 1.06 |
| | 7+ years old; any designation | 1.00 | |
| Scrap – broken down by age of vehicle and time since designation | no | 1.00 | |
| | yes and 0-6 years old; designation less than 3 years ago | 4.50 – 6.50 | 6.01 |
| | yes and 0-6 years old; designation more than 3 years ago | 3.50 – 5.50 | 5.07 |
| | yes and 7+ years old; any designation | 1.30 – 2.60 | 2.20 |
| Severe | no | 1.00 | |
| | yes | 1.01 – 1.08 | 1.03 |
| Theft – broken down by age of vehicle and time since designation | no | 1.00 | |
| | yes and 0-4 years old; designation less than 3 years ago | 3.00 – 4.00 | 3.46 |
| | yes and 0-4 years old; designation more than 3 years ago | 2.00 – 3.50 | 3.10 |
| | yes and 5+ years old; any designation | 1.20 – 1.90 | 1.65 |
| Average length of time vehicle remained with each owner, broken down by age of vehicle | 0-3 years old t:0-6m | 1.03 – 1.09 | 1.05 |
| | 0-3 years old t:7m-1y | 1.00 – 1.06 | 1.02 |
| | 0-3 years old t:1-2y | 0.97 – 1.03 | 0.99 |
| | 0-3 years old t:2+y | 0.96 – 1.02 | 0.98 |
| | 4-7 years old t:0-6m | 1.10 – 1.16 | 1.12 |
| | 4-7 years old t:7m-1y | 1.01 – 1.07 | 1.03 |
| | 4-7 years old t:1-2y | 0.96 – 1.02 | 0.98 |
| | 4-7 years old t:2-3y | 0.94 – 1.00 | 0.96 |
| | 4-7 years old t:3+y | 0.90 – 0.96 | 0.92 |
| | 8-14 years old t:0-6m | 1.11 – 1.17 | 1.13 |
| | 8-14 years old t:7m-1y | 1.04 – 1.10 | 1.06 |
| | 8-14 years old t:1-2y | 0.97 – 1.03 | 0.99 |
| | 8-14 years old t:2-3y | 0.92 – 0.98 | 0.94 |
| | 8-14 years old t:3+y | 0.85 – 0.91 | 0.87 |
| | 15+ years old t:0-6m | 1.39 – 1.45 | 1.41 |
| | 15+ years old t:7m-1y | 1.14 – 1.20 | 1.16 |
| | 15+ years old t:1-2y | 1.04 – 1.10 | 1.06 |
| | 15+ years old t:2-3y | 0.97 – 1.03 | 0.99 |
| | 15+ years old t:3+y | 0.83 – 0.89 | 0.85 |
| | 99>ma | 1.01 – 1.07 | 1.03 |

FIGURE 4

SYSTEM AND METHOD FOR ANALYZING AND USING VEHICLE HISTORICAL DATA

FIELD OF THE INVENTION

The invention relates generally to the analysis and use of vehicle historical data. More specifically, the invention relates to a system and method of analyzing and using vehicle historical data to determine the future risk associated with a particular vehicle, including risk of future insurance loss.

BACKGROUND ART

Insurance is used to mitigate risk, and the price or even availability of insurance can depend on the risk associated with what is being insured. Insurance companies may evaluate a number of different data in determining whether to offer insurance to a particular customer, and if offered, how much to charge. In the vehicle insurance area, traditional factors may include historical claim history, driving record, gender, age, type of vehicle, and vehicle value. Much of this data is generally referred to herein as "traditional insurance factors", and generally excludes information relating to the history of a specific vehicle being insured, or being considered for insurance.

Statistical analysis over many years of tracking insurance policies has shown that the existence of certain traditional insurance factors has value in predicting the risk associated with certain drivers and vehicles, including both the frequency of a future loss event, and the severity of that future loss event. For example, statistical analysis might show that there is greater risk of loss incurred in insuring a sports car driven by a teen age boy with multiple speeding tickets than there is in insuring a minivan driven by a middle aged woman with no moving violations. Thus, an insurance company may decide to not even offer insurance to the teen age driver, or if it does, to offer it at a much higher cost. Insurance companies evaluate multiple variables and factors to determine risk, and more accurate evaluations of risk improve the ability of insurance companies to maintain profitability by pricing and/or underwriting risk more accurately and appropriately, as well as to tailor product eligibility for specific individuals.

"Risk" is often viewed as a combination of predicted frequency and severity, where "frequency" predicts the probability that a loss event will occur within a given timeframe, and "severity" predicts the loss cost in dollars of that particular event. In the insurance industry, "severity" is routinely calculated by dividing loss dollars for a given timeframe by the number of claims within that same timeframe. Breaking risk down into different components can enable a better understanding of the risk, and that can help to improve the estimation of risk for a given situation. A better understanding of risk can lead to better correlations of risk to cost, which can minimize instances of mistakenly overcharging or undercharging for insurance. This can lead to better or more predictable profits for insurance companies, and ultimately more appropriate rates for consumers.

Insurance companies typically analyze historical carrier loss and premium data to create statistical models that estimate risk based primarily or entirely on that analysis. These models are used to assess expected risk. That assessment can be used by an insurance company to determine if a policy should be issued, or if it is issued, what rate should be charged for that policy. However, many insurance companies may have different determinations as to which traditional insurance factors (or data) have the greatest impact (or largest predictive value) on their customers, and thus a multitude of models can be used across insurance companies. Insurance companies use specific industry terms to describe and communicate insurance-related concepts. Knowledge of these terms can aid in understanding discussions of insurance policies and considerations. A few of these terms are defined below.

"Loss dollars" means actual dollars paid by an insurance carrier due to a claim or a group of claims incurred by a particular risk group.

"Earned premium" can be defined as the amount of total premiums collected by an insurance company over a period of time that have been earned based on the ratio of the time passed on the policies to their effective life. This pro-rated amount of paid-in-advance premiums have been "earned" and now belong to the insurer. For instance, if a person was two months into a six month policy that was paid for in advance, there would be approximately two months of earned premium for the insurance company. The remaining four months of premium is called unearned premium.

"Loss ratio" means the loss dollars divided by the earned premium. This is typically expressed as a decimal or a percentage. This number is indicative of financial performance, and many carriers calculate a maximum acceptable loss ratio to support some defined profit margin. Ratios higher than this maximum indicate either a loss or a reduced profit margin.

"Pure premium" means the total premium that is needed to pay expected losses, and is normally calculated by multiplying frequency by severity (discussed further below). Pure premium differs from Loss Ratio in that it does not convey financial performance as it is simply the amount of loss dollars paid irrespective of whether this is done at a profit or loss to the carrier.

"Nonstandard risk" is an automobile insurance driver market characterization or classification based on high risk designations, typically associated with some combination of the following characteristics: no prior automobile insurance, selection of minimum Bodily Injury (BI) coverage limits, and/or presence of significant driving violations (i.e. DUI, multiple accidents or speeds, etc.).

"Standard/Preferred risk" is an automobile insurance driver market characterization or classification based on low to moderate risk designations, typically associated with some combination of the following characteristics: lengthy history of prior automobile insurance, selection of greater than minimum Bodily Injury (BI) coverage limits, and/or clean driving record with few, if any, driving violations.

"Vehicle symbol" is an automobile insurance rating variable for both liability and physical damage coverage that characterizes vehicle risk associated with the make, model, trim level, and sometimes model year of a particular vehicle (i.e. 2010 Ford Mustang GT convertible). These symbols can be developed internally as proprietary to an insurer or they can be purchased from large data aggregators (i.e. ISO).

"Underwriting" is typically defined as the process where an insurance company decides whether or where it is willing to place a risk within that company's product offerings. Underwriting decisions can include whether or not to accept a risk as a customer. If a company opts to insure a customer, additional underwriting can be used to determine what insurance program or product the customer is eligible for, or even what specific coverage features or options within a program or product that customer is eligible for.

"Rating" is the process where an insurance company utilizes risk characteristics to determine the amount to charge a customer for insurance.

In evaluating the risk associated with a particular policy, insurance companies have not historically considered or evaluated detailed information on the unique history specific to each individual vehicle (at a 17 digit Vehicle Identification Number level for vehicles with a model year of 1981 or newer) being insured or considered for insurance. Consequently, a need exists for a system and method for analyzing risk using vehicle history data for a specific individual vehicle.

SUMMARY OF THE INVENTION

In some aspects, the invention relates to a method of determining risk for a vehicle comprising obtaining vehicle history data for the vehicle from a vehicle history database based on the vehicle's vehicle identification number (VIN), analyzing the vehicle history data to determine the applicability of one or more vehicle variables to one or more predetermined timeframe criteria, assigning a value to the one or more vehicle variables based on the applicability of the one or more predetermined timeframe criteria, and generating a risk score for the vehicle based on the values assigned to the one or more vehicle variables.

In other aspects, the invention relates to obtaining vehicle history data comprising vehicle event codes, event code dates, odometer readings, and odometer reading dates.

In other aspects, the invention relates to analyzing vehicle history data to determine applicability of the age of the vehicle, the time that has passed since one or more event code dates, and/or the time that has passed since one or more odometer reading dates.

In other aspects, the invention relates to generating a risk score where the risk score is adjusted based on traditional insurance factors, or specifically adjusted based on demographic information of a driver on the vehicle or the age of the vehicle.

In other aspects, the invention relates to generating a risk score where the risk score is scaled to represent the relative risk of the vehicle, and where the risk score, or scaled risk score, is transmitted to an insurance provider for use in rating or underwriting an insurance policy.

In other aspects, the invention relates to using vehicle variables comprised of failed inspection, fleet designation, minor accident, odometer readings, time since most recent odometer reading, salvage, scrap, theft, and average length of time of vehicle ownership.

In other aspects, the invention relates to using generalized linear model (GLM) method to generate a risk score.

Other aspects and advantages of the invention will be apparent from the following description and the appended claims.

BRIEF DESCRIPTION OF DRAWINGS

It should be noted that identical features in different drawings are shown with the same reference numeral.

FIG. 2 is a schematic of one embodiment of a database containing vehicle history data.

FIG. 3 is a chart of final factors for select variables in accordance with one embodiment of the invention.

FIG. 4 is a chart of final factors for select variables in accordance with one embodiment of the invention.

DETAILED DESCRIPTION

Figure 1:
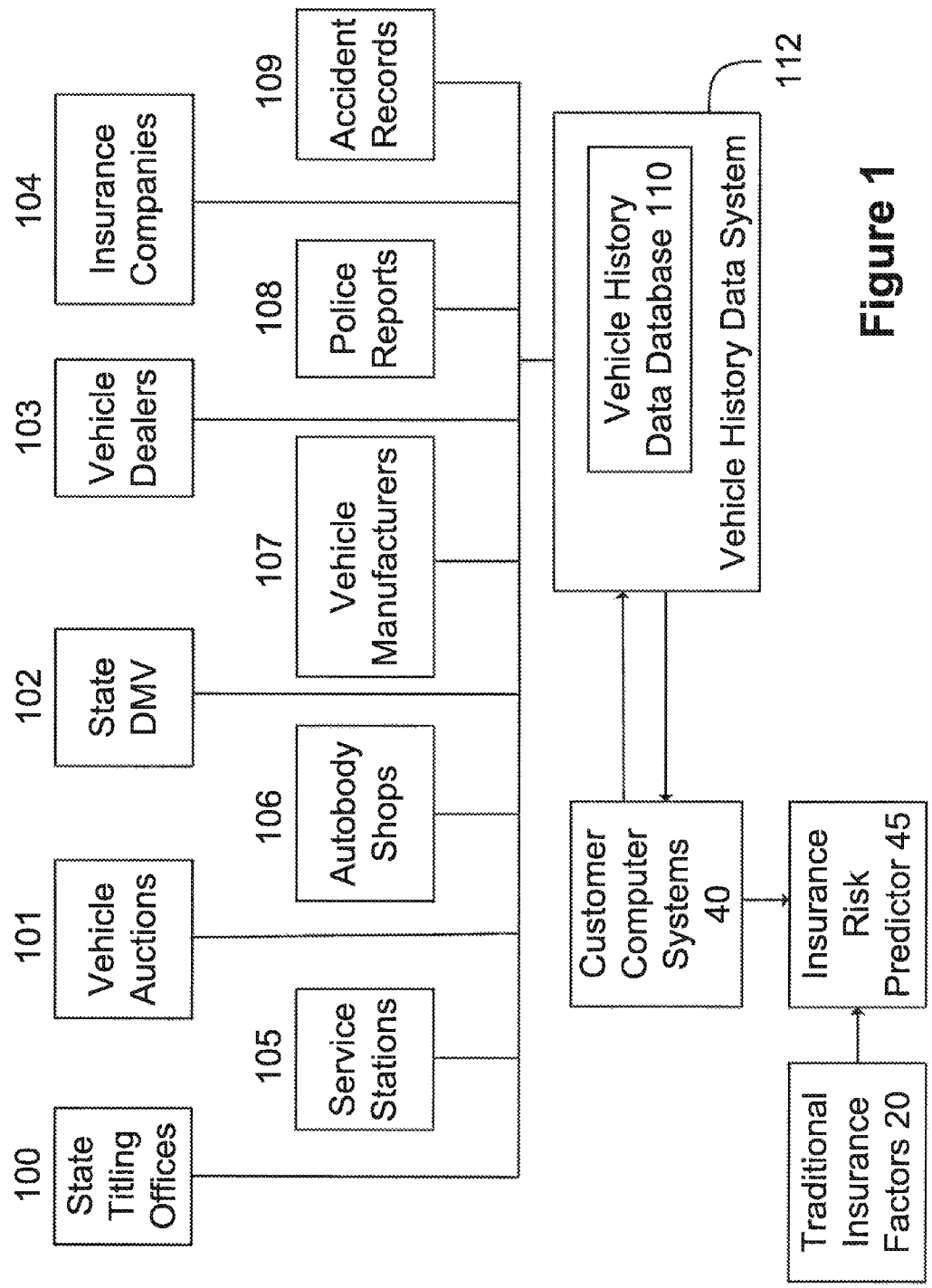
FIG. 1 is a schematic of various potential sources of vehicle history data and their relationship to one embodiment of the present invention.

Applicant has developed a system and method for using vehicle historical data that overcomes the existing limitations in the art, and is statistically correlated to loss, and can thus be used predicatively. This correlation allows insurance carriers to manage vehicle history data related loss ratios by pricing and ultimate loss dollars by underwriting (accepting or rejecting a risk). As carriers get better at assessing future losses, this typically translates into increased profits and ultimately increased revenue as well. The system and method for using vehicle historical data as disclosed herein can be utilized for the purposes of underwriting and/or rating by itself, or it can be combined with other traditional insurance factors affecting underwriting and rating. It can also be used specifically for different types of insurance coverage, including bodily injury, property damage, personal injury protection, uninsured/underinsured motorist bodily injury, uninsured motorist property damage, comprehensive, collision, commercial multiperil, cause of loss insurance, and others. The system and methods disclosed can also be used outside of the insurance industry, including for estimating and pricing risk associated with (1) financing certain vehicle loans; (2) vehicle warranty offerings, and (3) vehicle repair costs. The various aspects and benefits of Applicant's new system and method are discussed further below.

Insurance companies have used risk determination for many years. However, insurance companies have primarily relied upon analysis of traditional insurance factors 20 to evaluate the potential risk associated with existing or prospective vehicle insurance policies, for example, age, sex, marital status, driving record, where the vehicle is driven, miles driven, type of vehicle driven, claim history, etc. Insurance companies have not traditionally considered detailed information relating to the history of a particular vehicle. Admittedly, insurance carriers may consider some vehicle information that is readily apparent to consumers from a basic inspection of the vehicle or associated paperwork, such as the age of a vehicle (or model year), vehicle symbol, customizations done to the vehicle, or the total miles driven. For this disclosure, such characteristics are considered traditional insurance factors 20. However, historically, vehicle historical data that was not readily apparent, or readily available, to the average consumer (or insurance company) was not a major factor in determining underwriting or rating for insurance policies.

For the purposes of this disclosure, such historical information about a particular vehicle is referred to herein as vehicle history data 22, and includes, among other characteristics and/or designations: junk vehicle, crash test vehicle, salvage, destroyed, theft, unrebuildable, manufacturer buyback, reconstructed, reconditioned, remanufactured, storm damage, rebuilt, water damage, abandoned, fire damage, insurance loss, registration to insurance companies, lemon, scrapped, recycling facility, air bag missing/defective, major repair, major damage, inconsistent badge, irreparable, manufacturer recall, frame damage, unibody damage, title branded, total loss, biohazard, structural damage, multiple impacts, rollover, stripped, vandalized, airbag deployed, multiple airbags deployed, body parts missing (e.g. engine, transmission, etc.), taxi use, repossession, police use, fleet/lease rental, hail, livery use, municipal use, government use, military use, failed emission inspection, failed safety inspection, ABS defective, repossessed affidavit or title, material variation production specs, smoke damage, accident reported, collision/impact/damage (which can be further specified by the location on the vehicle, and item causing the damage, e.g., sign, utility pole, bridge, tree, another vehicle, etc.), new title records, dmv transactions, duplicate titles, dealer transfer transactions, corrected title, bonded/court ordered title, titled/registered as fleet/rental/taxi, historical odometer readings, registration, kit vehicle, replacement vehicle identification number or "VIN" issued, mileage discrepancy, not actual miles, suspect miles, odometer reading not certified, grey market, broken or replaced odometer, driver education, motor change, gross weight exemption, unknown odometer reading, dealer plates, certified pre-owned, and service records (e.g., cooling system serviced, front brakes serviced, brakes serviced, tires replaced).

As shown in FIG. 1, vehicle history data 22 is available from a variety of sources and data suppliers, including but not limited to state titling offices 100, vehicle auctions 101, State Department of Motor Vehicles offices 102, vehicle dealers 103, insurance companies 104, service stations 105, autobody shops 106, vehicle manufacturers 107, police reports 108, and accident records 109. There are entities that collect, organize, and store vehicle history data 22 in large computerized and searchable databases 110, including Experian Automotive and Carfax. These databases 110 can include millions and millions of records.

The database 110 is normally part of a larger vehicle history data system 112 that communicates with the vehicle history data 22 sources and suppliers, and to customer computer systems 40, or other third party systems (not shown in FIG. 1). The communication can be implemented using any standard communication types and protocols known in the art, including direct connections, the Internet, cellular or other wireless networks, local area networks, or wide area networks. The vehicle history data system 112 may be a single device in a single location, or multiple networked devices in the same or different locations.

Referring now to FIG. 2, generally, the information in the database 110 may be linked and identified with a vehicle's unique vehicle identification number, or VIN 115. The databases may also include other basic vehicle information 117 about a particular vehicle, including the body style 120 (sedan, coupe, 2 door, 4 door, etc.), the class (for example, luxury, economy, etc.) 125, the country 130, engine type 135, manufacturer 140, and model 145.

Also within the database 110 are a wide variety of event codes 15, 15b, etc., with the event code 15 often representing different vehicle history data 22 for a particular vehicle. For example, there may be an event code 15 for a repossession record, a different event code 15 for a fire damage record, and a different event code 15 for a police use record. Some vehicles may have only a few event codes 15 associated with it, while others may have hundreds of associated event codes 15. It is possible, however, that two different event codes 15 could represent nearly identical data. For example, there may be two (or more) different event codes 15 for minor damage, storm damage, repossession, scrap, or salvage, perhaps just representing different sources of the data.

Different data providers (e.g., Experian, Carfax, or other vehicle history providers) may structure their records and event codes 15 differently. There could be hundreds of possible event codes 15 depending on a data provider's preference. For example, one data provider may have separate event codes 15 for minor damage depending on whether it was to the front right side, front left side, or rear of the car, while a different data provider may classify all of that under one event code 15. Referring again to FIG. 2, many event codes 15 also have an associated event code date 25a, 25b, etc. For example, for a "registration" of title event, it will often have the date of that registration. The same is true for many of the other vehicle history data 22 represented by event codes 15. For example, a "scrap" designation (or record), accident designation (or record), or theft designation (or record), can all have an event code date 25 associated with it. Thus, a large amount of the data will have event code dates 25 associated with them.

Referring again to FIG. 2, in addition to the basic vehicle information 117, event codes 15, and event code dates 25, the database 110 may also include odometer reading records 30, with corresponding odometer reading record dates 35, for each VIN 115. Each VIN may have multiple odometer reading record 30 entries and odometer reading record dates 35. Thus, the vehicle history data 22 for a particular VIN 115 is often comprised of event codes 15, event code dates 25, odometer reading records 30, and corresponding odometer reading record dates 35, for each VIN 115.

Referring now to FIG. 1, customers (e.g., consumers, insurance companies, or third party service providers) can order a report for a particular vehicle via a customer computer system 40 by providing the data provider with one or more VIN 115 for the data provider's vehicle history data system 112. Orders can be facilitated through the data provider's public website and interface, for example through Experian's AutoCheck® website, or can be through a customized or specialized interface. The data provider's vehicle history data system 112 have searching and indexing functions to extract the requested information related to the identified VIN 115. The reports provided by these data providers will normally include the basic vehicle information 117 and the vehicle history data 22, and is generally referred to as a vehicle history report, or "VHR" 10. However, a VHR may only include vehicle history data 22, or only portions of vehicle history data 22, for example certain event codes 15, event code dates 25, certain odometer reading records 30, or certain odometer reading record dates 35. The format and content of the VHR 10 may be specified by the request from the customer computer system 40, by the database 110 search functions, or by the data provider maintaining database 110. VHRs 10 can include just the raw data related to a vehicle, or be formatted into a more visually pleasing format that consumers recognize as the AutoCheck report from Experian Automotive or the Carfax® report from Carfax.

Customers that obtain VHR 10 from the vehicle history data database 110 can then utilize that information for the purposes of underwriting and/or rating insurance. As shown in FIG. 1, information from the VHR 10 can be combined with traditional insurance factors 20 in an insurance risk predictor 45 to evaluate the potential risk associated with an existing or prospective insurance policy. Different insurance companies may elect to include or exclude VHR 10, traditional insurance factors 20 and/or portions thereof, as inputs to its insurance risk predictor 45.

Unfortunately, the actual impact on risk due to the existence of any one VHR event code 15, event code date 25, odometer reading record 30, or odometer reading record date 35, is not necessarily clear to most insurance companies or other parties using vehicle history data 22. For example, an insurance company may not intuitively know if the fact a car was previously used as a rental vehicle is more or less of a risk than the fact that same car was previously involved in a minor accident or failed an emissions test. Therefore, simply purchasing a VHR 10 does not provide all the necessary information to determine how the historical events for a particular vehicle will impact the risk of insuring that vehicle. Additionally, different individuals with different experiences may believe some factors have a bigger impact on risk than others. In that case, you get subjective decisions that could differ from individual to individual.

Determination of Risk

One way of estimating the overall risk of several different types of factors is to obtain a large body of historical loss and premium data (preferably millions of records) from an insurance company, and run tests to determine how different factors impact subsequent losses. Similar tests can be run with other data sets to determine risks associated with other potential uses of the vehicle history, for example estimation of the risk of financing vehicle loans, warranty offerings for vehicles, etc. For these other potential uses, the analysis discussed below will be similar, but tailored to the specific use. For example, for use in evaluating risk of financing vehicle loans, data relating to problem loans (e.g., loans that were not repaid in full) could be evaluated to determine the correlation of vehicle history to those loans. Thus, the analysis may show that vehicles having multiple title changes in the last six months prior to the loan were more likely to result in problem loans. Similarly, for vehicles with prior frame damage (that is unknown to the lender), the lender may end up collateralizing loans in excess of the actual value of the vehicle, and this may also result in a problem loan for the lender.

For brevity, the majority of the description herein is directed to use in connection with vehicle insurance, but it should be recognized that the principles and disclosure herein is equally applicable to other applications. The more detailed and complete the historical data, the better for determining the risk. The historical data should cover an extended time period, preferably 10 or more years, and it should include loss data as well. The losses can be characterized and evaluated broadly, for example all liability costs and all physical damage costs. Alternatively, the losses can be broken down by specific perils, for example, bodily injury, property damage, personal injury protection, uninsured/underinsured motorist bodily injury, uninsured motorist property damage, etc. Emphasizing VHR event codes 15 in the analysis and testing can produce a model that estimates and predicts risks for a particular vehicle based on the VHR 10. This allows an insurance company to add VHR analysis into its risk assessment to increase pricing and/or underwriting accuracy. The historical data used can be updated over time to provide more data, and updates might be able to show developing trends that modify or change the impact of some type of event on risk. This could be due to new technology that disproportionately impacts one type of event. Detailed below is one example of how to evaluate the risk impact for the various VHR event codes 15 and odometer reading records 30, but variations or other techniques are also possible.

In this embodiment, the first step is to obtain historical data for multiple vehicles that can be used to construct a research database suitable for modeling the effect of vehicle history data 22 on the propensity to predict insurance risk. This historical data should include vehicle history data 22 and insurance carrier provided historical policies containing premiums, losses, and traditional insurance factors 20 used in the carrier rating plan. The historical policies from the carrier preferably contain all 17 digit VINs associated with each vehicle on a policy. Each policy preferably represents one policy term, typically defined under a 6 or 12 month contract (although other monthly increments are possible). As an example, an individual may come to an insurance provider and sign up for one policy term initially considered new business. The customer may choose to renew their business with the carrier for a subsequent term. In this instance, the customer has 2 terms that for analysis purposes would be considered 2 separate policies within the historical data. Each policy has an effective date defined as the beginning point of the term. Thus, a particular vehicle, with a particular VIN, that has been renewed for 12 policy terms, may have 12 separate entries with associated data for that policy term. All premiums earned and losses incurred should be confined to each policy term. Each vehicle, identified by a 17 digit VIN, preferably will also have an effective date known as the VIN effective date identifying the date on which that vehicle first was insured on the policy. In most cases the VIN effective date will be the same as the policy effective date except in certain instances where a vehicle is added to the policy after the start of the policy period (i.e. after the policy effective date). Vehicle history data 22, including event codes 15, and event code dates 25, odometer reading records 30, with corresponding odometer reading record dates 35, are preferably appended to each distinct VIN. This match is accomplished using the 17 digit VIN and now makes it possible to compare the VIN effective date to all dates associated with the event codes 15 and odometer reading records 30. The best predictive comparison can be made when the vehicle history data 22 associated with a VIN, and thus a particular VIN effective date, is restricted to event codes 25 and/or odometer reading records 30, with a date prior to the corresponding VIN effective date.

For the information made available, in this embodiment, the model year of the vehicles must be determined so the age of the vehicle with respect to the provided effective date can be determined. This can be done using the formula vehicle age=year of policy effective date minus model year. The vehicle history data 22 is combined with each VIN and policy effective date combination, and inapplicable VHR event codes 15 and Odometer reading records 30 are removed. Then, the variables are created as set forth below.

Variable Creation

Once the research database is constructed, the variable testing can begin. For example, it needs to be determined what variables are predictive of future loss, and if a particular variable is in fact predictive of future loss, if there are then certain time period breakdowns that are more accurate in predicting that future loss than others. Thus the testing may determine that the color of the vehicle is not predictive of future loss, but that vehicles with a salvage title are predictive of future loss. Similarly, it may be determined that breaking down salvage title entries by proximity to the VIN effective date is even more effective in predicting loss, than just considering salvage title generally. Thus, various variables and various time periods are tested and evaluated, using varying evaluation periods. A vehicle history data variable evaluation period involves the timing around a valid comparison between the data provided by an insurance carrier associated with a 17 digit VIN and the vehicle history data 22. With this in mind, numerous time periods, or vehicle history data variable evaluation periods, can be calculated to reflect how recent an event has occurred as well as the frequency of similar loss events across different time periods (example: number of occurrences between 12 and 24 months). For example, tests may be run to determine applicability of salvage records generally, or salvage records within a 1-2 year window, or 1-3 year window, etc. Similar tests can be run on salvage records during a single time window, or multiple time windows, for vehicles of various ages, or various age ranges. Similar tests can be run for the various vehicle history data 22. The initial test criteria may be set by intuitive estimates based on the experience or expectation of the users. For example, the user may theorize that a vehicle with a salvage title within the past 2 years has a higher occurrence of loss than a vehicle with a salvage title within the past 3-5 years. The initial test results are then analyzed to determine if the results are truly correlative with the data. The test criteria may then be adjusted to better fine tune the tests to develop meaningful results.

Once the research database is obtained, variables 42 are selected for modeling. In one embodiment, variables 42 are divided into two different groups, (1) vehicle variables 44 which include VHR event codes 15 and/or Odometer reading records 30; and (2) standard variables 46 which do not include VHR event codes 15 or Odometer reading records 30. Standard variables 46 are based on traditional insurance factors 20. Vehicle variables 44 can be based on one single VHR event code 15 or single Odometer reading record 30, or they can be a combination of VHR event codes 15, a combination of Odometer reading record 30, or even a combination of VHR event codes 15/Odometer reading records 30 and traditional insurance factors 20. Most vehicle variables 44 are either one VHR event code 15 or related Odometer reading record 30, or a grouping of several VHR event codes 15 that are preferably similar (such as all minor accident event codes 15) or have similar loss prediction value.

In one embodiment of the present invention, the following vehicle variables 44 where chosen for modeling: (1) failed inspection; (2) fleet; (3) minor accident/miscellaneous; (4) odometer reading; (5) time of last odometer reading; (6) rental; (7) repossession; (8) salvage; (9) scrap; (10) severe accident; (11) theft; (12) title length (how long most recent owner owned the vehicle). In this example, vehicle variables 44 (1)-(3), and (6)-(12) would have VHR event codes 15 (and event code dates 25) associated with them, and vehicle variables 44 (4)-(5) would be based on odometer reading records 30 (and odometer reading records dates 35). Other groupings and variables are obviously possible.

It should be recognized that odometer readings and the time of last odometer reading may not have associated VHR event codes 15. Additionally, a number of VHR event codes 15 may be included or associated within a vehicle variable 44. Preferably, event codes 15 associated or included within a vehicle variable 44 are similar in type, or similar in loss ratio/risk prediction. For example, a "failed inspection" vehicle variable 44 may include event codes 15 for (1) failure of a state emission inspection, (2) failed safety inspection, or (3) other state, federal, or other regulatory inspections for various vehicles. Furthermore, a "fleet" vehicle variable 44 may include event codes 15 for (1) seller disclosed lease/fleet, (2) auction announced fleet/lease, (3) commercial fleet inventory, (4) fleet designation, etc. Similarly, a "minor accident/miscellaneous" vehicle variable 44 may include things like taxi use, police use, hail damage, government use, reported insurance loss, collision repair performed, and various impacts and collisions (generally, repairable damage), each of which may have its own event code 15. "Rental" may include designations as a rental car or auction announced as a rental car. "Repossession" may include repossessions of the vehicle, including auction announced repossessions. "Salvage" may include designations of salvage, prior salvage, auction announced salvage, and sold or reported at salvage auction. "Scrap" may include designations of unrebuildable, junk vehicle, scrapped, crushed, crash test vehicle, recycled, etc. "Severe" may include things like reconstructed, manufacturer buyback, reconditioned, remanufactured, rebuilt, water damage, abandoned, fire damage, lemon, registered to insurance company, frame damage, major damage, etc. "Theft" can include theft, theft reported, and theft recovered.

In addition to choosing the vehicle variables 44 for modeling, the present invention can include taking into account recency of an event (i.e., event was observed within certain time period from the present or from another distinguishable point in time), the frequency of similar events (i.e., number of observations within a given period of time), age of a vehicle, and in some cases, only the simple presence/absence of an event.

Applicant has found that modeling the impact of certain vehicle history data 22 broken down by time can lead to significant improvements in predicting the risk of certain insurance. Specifically, a number of the vehicle variables 44 can also be matrixed with dates or various time periods. For example, a 1 year old vehicle failing a state inspection may be much more of a redflag than a 10 year old vehicle failing the same inspection. Likewise, a 2 year old vehicle with a "fleet" designation can be treated differently than a 10 year old vehicle with a "fleet" designation. Although a variety of further classifications is possible, one embodiment breaks down the various vehicle variables 44 into the following time categories:

(1) Failed inspection (a) vehicle age of 0-6 years; and (b) more than 6 years;
(2) Fleet (a) vehicle age of 0-3 years; (b) 4-6 years; (c) 7-12 years; and (d) more than 12 years;
(3) time since last minor accident/miscellaneous (a) 0-6 months; (b) 7-12 months; (c) 1-2 years; (d) 2-3 years; (e) more than 3 years;
(4) odometer reading can be broken down into groups of different mileage categories (for example, 0-25,000; 25,001-50,000; 50,001-75,000; 75,001-100,000; 100,001-150,000; more than 150,000), along with different time periods: (a) age of vehicle 0-2 years; (b) 3-5 years; (c) 6-8 years; (d) 9-11 years; (e) 12-14 years; and (f) 15+ years.
(5) time since last odometer reading can be broken down both in days since last reading (for example, (a) 1-365 days, (b) 366-730 days, (c) 731-1095 days; and (d) 1096+ days) and based on the age of the vehicle (for example, (a) 0-5 years; (b) 6-9; (c) 10-12; and (d) 13+).
(6) Salvage can be broken down into the number of days since the most recent salvage designation was recorded for the vehicle broken down into groups of (a) 0-1095 days and (b) 1096+ days. The variable can be further broken down based on the age of the vehicle of (c) 0-3 years; and (d) 4+ years.
(7) Scrap salvage can be broken down into the number of days since the most recent scrap designation was recorded for the vehicle broken down into groups of (a) 0-1095 days and (b) 1096+ days. The variable can be further broken down based on the age of the vehicle of (c) 0-6 years; and (d) 6+ years.
(8) Theft can be broken down into groups of (a) 0-3 years and (b) 3+ years since the designation. The variable can be further broken down based on the age of the vehicle as (a) 0-4 years and (b) 5+ years.
(9) Title length can be broken down into the average length of time the vehicle has remained with each owner broken down by days and based on the age of the vehicle. Thus, the average ownership time may be broken down into (a)

1-182 days; (b) 183-365 days; (c) 366-730 days; (d) 731-1095 days; (e) 1096+ days. The age of the vehicle can likewise be broken down as (a) 0-3 years; (b) 4-7 years; (c) 8-14 years; and (d) 15+ years.

While vehicle variables 44 for rental, repossession, and severe accident were not specifically discussed using additional time categories, they can be broken down in a similar fashion. However, some variables may not have as large an impact based on the amount of time that has expired since a particular event took place. In those instances, users may elect not to include time impacted elements. Obviously, different vehicle age categories can be used, and different days since a particular event category can be used. As demonstrated herein, different vehicle age categories may be used for different vehicle variables 44, but the same ones could be used as well. Thus, vehicle variables 44 can be broken down into various vehicle variable levels 50, both by age of the vehicle and/or days since some occurrence. In this context, vehicle variables 44 broken down into various vehicle variable levels 50 are referred to herein as enhanced vehicle variables 55. Thus, the vehicle history data 22 for a particular vehicle can be analyzed to determine the applicability of one or more of the vehicle variables 44 to one or more predetermined timeframe criteria (or vehicle variable levels 50). For example, the vehicle variable 44 salvage may be broken down into vehicle variable levels 50 for vehicles 0-3 years old, 4-7 years old, and 8+ years old, and/or less than 3 years since the salvage designation or more than 3 years since the salvage designation. When the vehicle history data 22 of a particular vehicle is analyzed, it can be determined if there is a salvage designation (by looking at the event codes 15 associated with salvage), and if so, which vehicle age range it falls into, and which age range since the designation it falls into. Each salvage vehicle age/age range since designation may have an associated value, which can be assigned for that vehicle variable 44, for that particular vehicle.

The enhanced vehicle variable 50 can be used to predict risk in place of the selected vehicle variable 44, or in addition to the selected vehicle variable 44. It is also possible to weight the enhanced vehicle variable 50 and the selected vehicle variable 44 the same or differently. The enhanced vehicle variable 50 provides another tool which can be used to help improve risk estimation accuracy based on historical vehicle data.

For the vehicle variables 44 selected for modeling, and with the different vehicle variable levels 50 outlined above, the data can be modeled. In the preferred embodiment, two separate models are created, one for explaining variation in frequency and one for explaining variation in severity. The model uses carrier premiums as offsets, meaning that the rated premium for the vehicle is used as a generalized linear model offset for the frequency model and the severity model. These premiums are based on industry segmentation and rating variables that help explain much of the variation for frequency and severity that would be found within many of the rating plans utilized in the industry. The offsetting method allows for a more accurate estimation of the vehicle history data 22 effect on explaining and predicting frequency and severity and minimizes any overlap in the explanation and prediction provided by the other rating variables. By utilizing the carrier rated premium, the model is able to determine the vehicle history data variable's effect on loss ratio, independent of the variables traditionally considered by carriers.

Many of the vehicle variables 44 can be designated as the presence or absence of the particular vehicle variable 44. For example, a particular vehicle may have failed inspections, no fleet designations, and no theft records. Thus, the vehicle variables 44 can be a yes or a no which can be saved as a 1 or 0, or it can be a numerical value. There is also a date associated with many of the VHR event codes 15, such as the event code date 25. For example, one possible vehicle variable 44 is for minor accidents, and that variable could be populated with either a yes or no, or a 1 or 0 to indicate yes or no, and if a yes is designated, it further categorized into the appropriate time frame or vehicle variable levels 50, e.g., (a) 0-6 months; (b) 7-12 months; (c) 1-2 years; (d) 2-3 years; or (e) more than 3 years since the minor accident. However, another possible vehicle variable 44 could be mileage which requires a numerical value other than 0 or 1. It is also possible to do a count of data comprising the vehicle variables 44, so the minor accident field could indicate the number of minor accidents for the vehicle. The vehicle variable 44 for a minor accident could be a 1 or 0 taken directly from the VHR event code 15 indicating a minor accident, or the vehicle variable 44 could be a count of minor accidents taken from the VIHR event codes 15.

The output for each of these models is a predictive factor relating the magnitude of predicted frequency or severity for each vehicle variable 44 and/or vehicle variable levels 50. Another term for this factor is a "relativity" given that it relates the vehicle variable 44 and/or vehicle variable levels 50 predicted risk to that of the overall body of data (i.e. a relativity/factor of 1.25 for a vehicle variable 44 indicates that it's magnitude is 25% greater than that of the overall average observed frequency or severity for the entire dataset). The larger the relativity/factor, the greater the magnitude of predicted frequency or severity.

The resulting frequency and severity factors for each vehicle variable 44 and/or vehicle variable levels 50 were multiplied together to create a Pure Premium factor 48 for each vehicle variable 44 and/or vehicle variable levels 50. Some judgment is typically applied when selecting final Pure Premium factors 48 (i.e. final Pure Premium factors utilized can be derived by weighting the frequency factor more heavily than the severity factor, etc.). Typically, frequency is often weighted more heavily than severity, and/or some cap can be utilized to minimize the impact of catastrophic occurrences that may spike the "severity factor." Final Factors 52 yielded by the preferred embodiment of the model for each vehicle variable 44, and/or enhanced vehicle variable 55 by vehicle variable levels 50 are included in FIGS. 3 and 4. The values reflected in FIGS. 3 and 4 are based on the losses from all coverage types (e.g., liability loss costs and physical damage loss costs). As discussed above, separate final factors 52 can be derived for individual perils such as bodily injury, property damage, etc., by focusing on just those specific and associated losses when evaluating the vehicle history data 22, as discussed above. For example, frame damage may have a bigger impact on risk of bodily injury loss than on property damage loss, and an insurance company may want to more specifically tailor its models to take this into account.

In the preferred embodiment, when a vehicle variable 44 is not present in the history of a particular vehicle, the Final Factor 52 is 1.00 (i.e., it has no effect on the scoring of the vehicle). Final Factors 52 may or may not be different than the derived Pure Premium factor 48.

Once the Final Factors 52 for each vehicle variable 44 and/or enhanced vehicle variable 55 by vehicle variable levels 50 is determined, the individual vehicles included in the study can then be scored based on the presence or absence of the VHR event codes 15 and Odometer reading records 30. In the preferred embodiment, the vehicle score is derived by multiplying each of the vehicle variables 44 and/or vehicle variable levels 50 Final Factors 52 together to determine a vehicle history score 200. The scored vehicles can then be arranged by ordinal rank from the best to worst (or vice versa). Several "buckets" or groupings of vehicles within a defined range of scores, preferably with roughly equal populations (i.e. deciles, etc.), are made from ranked vehicle history score 200 groupings having similar loss experience, and these buckets are then correlated to aggregated actual observed loss ratios for the vehicles in a given bucket. The quotient of the highest risk group loss ratio divided by the lowest risk group loss ratio is generally referred to as "lift." The greater the lift, the better the model is at predicting loss, and the more able the model is to help the carrier accurately price vehicles now in anticipation of future loss.

In some embodiments, the vehicle history score 200 can be "scaled" so that the vehicle history score 200 reflects some other type of scoring or ranking system. For example, a user may want scores or ranks on a scale from 1-10, 1-100, 1-1000, A-F, etc. Thus, for example, if a user wanted a scale from 1-10, vehicle history scores 200 up to 1.0 may be designated as a 1, vehicle history scores 200 from 1.01-1.20 may be designated as 2, etc. Other scaled vehicle history scores 200 are obviously possible. The scaled vehicle history scores 200 can likewise be allocated to different buckets or groupings as discussed above. A series of buckets may be ranked or graded on a scale of 1-10, 1-100, 1-1000, A-F, etc. Each bucket can have a pre-defined range of scores that reflect the vehicles assigned to that bucket. In this manner, a insurance company may assign pricing based on the grading of the bucket. For example, an insurance company may use a series of ten buckets with an overall scale of 1-1000 points with each bucket having a 100 point range. Ideally, each bucket would also have 10% of the population of vehicles in the database. In this example, the first bucket would contain a score range of 1-100 for vehicles with a loss ratio of 0.8 or less. The second bucket would contain a score range of 101-200 for vehicles with a loss ratio of 0.81-0.85 and so forth. The first bucket may be assigned a multiplier of 0.85 to the standard rate of the insurance company to determine pricing for the vehicles in that bucket. Likewise, the second bucket may be assigned a multiplier of 0.90 to the standard rate to determine pricing for its vehicles and so forth. Clearly, the value of the multiplier could be adjusted as needed by the insurance company to ensure competitive pricing as well as ensuring profitable underwriting.

In still other embodiments, an insurance company may use scaled buckets as subsets for different groups based traditional insurance factors or other demographic information. For example, prospective customers may be grouped by age into several different ranges. In turn, each of these ranges may have their own scale of buckets. Each scale of buckets may produce different pricing results from comparable buckets in another group. In this manner, the number of buckets can be increased and specialized in order to maximize the accuracy of the pricing analysis.

As an alternative to the multiplicative model discussed here, regression models can also be used to generate vehicle history scores 200. For example, a [X]A+[Y]B . . . +[Z]C=score can be used, where X, Y, and Z are weighted factors (e.g. final factors 52) and A, B, and C are vehicle variables 44 and/or enhanced vehicle variables 55. As an example, A may relate to frame damage and represent a 1 if frame damage exist, and a 0 if no frame damage exists. The X may be weighted heavily if frame damage has been determined to significantly impact loss risk. B may represent a salvage title, with a 1 if a salvage title exists, and a 0 if no salvage title exists, etc. While a regression model can be used, the generalized linear model discussed herein is believed to be more accurate and predictive of risk.

Other approaches may also be utilized. For example, if there are one or two vehicle variables 44 that a user believes have the most significant impact on risk and/or loss ratio, that user may just correlate that single vehicle variable 44 against loss and/or loss ratio, and use a single multiplier to adjust its vehicle score, rating, or pricing. For example, a user's modeling may show that salvage titles have the largest impact on potential loss, and assign a multiplier of some designated amount, for example, 1.30, or 1.40, to be used against its standard score, rating, or pricing of similar vehicles and drivers without a salvage title. Thus, if no salvage title exist (as a yes/no decision), no adjustment is made. If salvage title exist, the score, rating, or pricing is directly adjusted by some set amount. Similarly, if more than one vehicle variable 44 is to be considered, rather than a direct multiplicative model, there can be multiple combinations, each category of which has its own rate factor. For example, if a user determines that a "scrap" designation, and "theft" designation have the biggest impact on risk, users could define 4 different categories, each with its own rating factor. For example, a vehicle with a scrap designation and a theft designation is assigned a rate factor of 10.00, a scrap but no theft designation of 6.00, a theft designation but no scrap of 4.00, and a no scrap and no theft of 1.00.

Separately, or as a supplement to the GLM process, a "machine learning" approach can be implemented to create variable values that correlate VHR data to insurance loss costs or loss ratio. Machine learning is a procedure that partitions the combined traditional insurance factors 20 and vehicle variable 44 population dataset into segments that can be utilized to create significant variables for VHR modeling. With a machine learning approach the following characteristics will be present (a) each segment will be homogeneous with respect to the VHR model response (i.e. loss ratio, pure premium, etc.) and (b) different segments will show a significant separation in expected outcome for the response. Unlike a GLM approach, machine learning is non-parametric in nature and it is not necessary to make assumptions about the underlying error distribution. This technique relies on an automated process (i.e. computer) to execute the computation needed to identify the important variables making up the segments (as opposed to the GLM variable selection process which can be largely manual and intuitive). The machine learning technique also requires a training and validation dataset to properly check the predicted outcomes. Employing a machine learning process typically results in the creation of more compound VHR modeling variables, and these compound VHR variables will involve a larger number of interactions with other variables.

Additional modeling techniques can also be employed to build a VIHR model that correlates VHR data to insurance loss costs or insurance loss ratio, including gradient boosting, neural networks, or decision trees. These are all modeling techniques known to those skilled in the art.

In some embodiments, the models are used to predict risk based on the VHR data, and all or nearly all of the variables 42 used are vehicle variables 44 that include data extracted from VHR event codes 15 and/or odometer reading records 30. If an insurance company is seeking a risk factor based primarily on VHR data, this type of model can be used. The risk factor produced from the VHR data can then be combined with other risk factors for use in underwriting and/or to determine a final policy rating.

Computer Use for Model Creation

The modeling described above can be done by an insurance company, a vehicle history data provider (e.g., Experian, Carfax, or other vehicle history provider), or any party having access to substantial vehicle history data 22. As discussed above, the data size needed to both accurately develop models associated with vehicle history data 22 and accommodate the various testing needed (including testing different variables, different time periods, different vehicle ages, etc) is in the millions of records, and thus requires computer systems. Preferably, the data size is at least five (5) million records.

Figure 5:
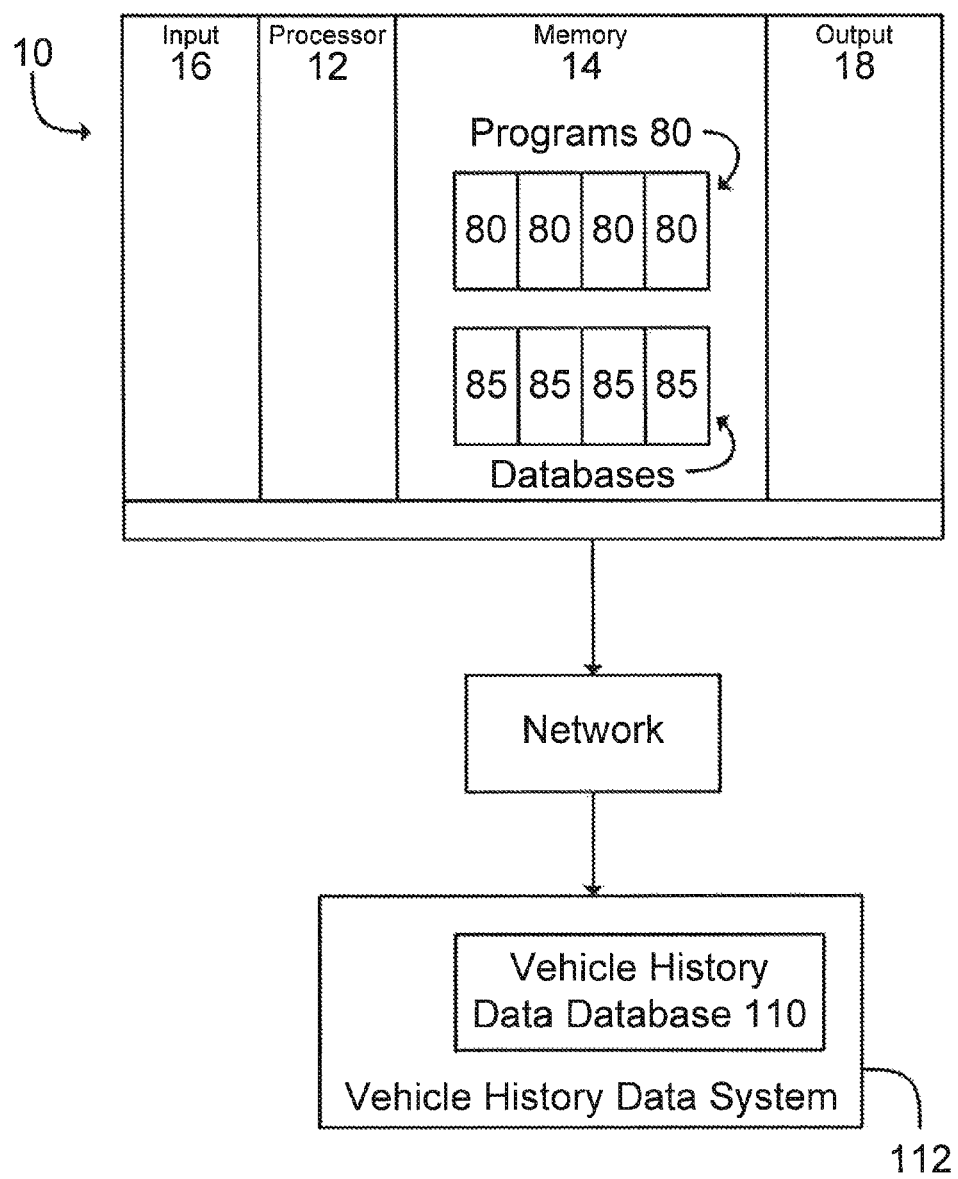
FIG. 5 is a schematic of one embodiment of the modeling computer and its relationship with a vehicle history data system.

As depicted in an exemplary embodiment of FIG. 5, a modeling computer 10 is used to rapidly process the large volume of information and data to evaluate risk associated with different vehicle variables 44. The volume of information processed, combined with the speed at which the information must be processed, makes the use of a modeling computer 10 necessary to implement the risk evaluation described herein. The modeling computer 10 will typically have a processor 12, such as central processing unit (CPU), where the processor 12 is linked to a memory 14, an input 16, and an output 18. A modeling computer 10 can include several other components as well, and the components listed above can be further classified. For example, the memory 14 can include a hard disc 20 for non-transitory storage of information (not shown), as well as random access memory (RAM). The input 16 can include a keyboard 22, a mouse 23, and a modem 24 (not shown) for electronic communication with other devices. The output 18 can include a modem 24, which can be the same modem 24 used for the input or a different one, as well as a monitor 26 or speakers 28 (not shown). Many of the different components can have varying physical locations, but they are still considered a computer for purposes of this description. For example, the memory 14 can be on a hard drive in the same container as the processor 12, or the memory 14 can be remotely located and accessed as needed using the input 16 and output 18. The memory 14 may also have one more programs 80 to carry out the modeling functions described above. The memory 14 may also have one more databases 85 containing vehicle history data 22, and/or traditional insurance factors 20. The modeling computer 10 may connect to a vehicle history data system 112, and associated vehicle history data database 110, through a network, or the modeling computer 10 may have its own vehicle history data 22 in memory. In an alternative embodiment, the modeling computer 10 could be part of the vehicle history data system 112.

Specific Risk Evaluation and Implementation

An insurance provider will gather certain information to estimate the risk for writing a vehicle policy. An insurance policy is typically written for a particular vehicle(s) and a particular individual, or group of individuals. The vehicle can be an automobile, but it could also be a boat, airplane, motorcycle, all terrain vehicles (ATV), or other types of vehicles. This description will focus on automobile insurance, but this description and analysis applies to other types of vehicles as well.

As discussed, by utilizing the modeling and analysis of vehicle history data 22 herein, insurance companies can better estimate risk of insuring a vehicle. One way to estimate risk related to a particular vehicle being considered for insurance is to apply a particular vehicle's history data 22 to the final factors 52 to generate a vehicle history score 200. In this simple embodiment, selected final factors 52 related to a particular vehicle are multiplied together for a vehicle history score 200. In the preferred embodiment, the applicable final factors described in FIGS. 3 and 4, for a particular vehicle, are multiplied together to obtain a vehicle history score 200. In other embodiments, selected applicable final factors, for a particular vehicle are multiplied together. As discussed above, regression models can also be used, or simplified models focusing on only one or a few select vehicle variables can be utilized. Thus, with reference to FIGS. 3 and 4, any one or more of the following can utilized: (1) failed inspection; (2) fleet; (3) minor accident/miscellaneous; (4) odometer reading; (5) time of last odometer reading; (6) rental; (7) repossession; (8) salvage; (9) scrap; (10) severe accident; (11) theft; (12) title length (how long most recent owner owned the vehicle).

As an example, and using the final factors described in FIGS. 3 and 4 for a multiplicative model, assume a vehicle history score 200 is desired for a particular vehicle, and the vehicle history data 22 for that particular vehicle shows:

1. It failed an inspection, and the vehicle is 2 years old—final factor 1.27
2. It has never had a fleet designation—final factor 1.00
3. It had a minor accident reported 3 months ago—final factor 1.47
4. The most recent odometer reading was 20,000 miles and the vehicle is 2 years old—final factor 0.88
5. The time since the most recent odometer reading was 14 months ago and the vehicle is 2 years old—final factor 1.00
6. It has never been a rental vehicle—final factor 1.00
7. It has been repossessed—final factor 1.16
8. It has not received a salvage designation—final factor 1.00
9. It received a scrap designation 2 years ago, and the vehicle is 2 years old—final factor 6.01
10. It has not received a severe designation—final factor 1.00
11. It received a theft designation 15 months ago, and the vehicle is 2 years old—final factor 3.46
12. The average length of time the vehicle remained with each owner is 8 months and the vehicle is 2 years old—final factor 1.02.

In this case, the vehicle history score would be 1.27*1.00*1.47*0.88*1.00*1.00*1.16*1.00*6.01*1.00*3.46*1.02=vehicle score of 40.42. It should be apparent that based on the modeling, certain factors affect the score more than others. Specifically, scrap designations and theft designations can greatly affect the overall score. It should also be apparent that some final factors can be less than 1.00, reflecting a lowering of the overall score. For example, an odometer reading of under 25,000 miles on a 18 month old car has a final factor of 0.88, actually lowering the overall vehicle history score.

In some embodiments, the vehicle history data 22 is not used to rate insurance policies, rather it is used to rate individual vehicles within a policy as a vehicle level rating factor. As such, it is normally combined with other policy and driver level rating factors, all of which ultimately combine to rate the policy for a particular vehicle. VHR modeling results in specific vehicle history scores 200 for each vehicle that only impacts that individual vehicle's distinct rating. Unlike some models and risk prediction systems, this allows individual vehicles to be analyzed, at an individual level, rather than at an insurance policy level which provides for more precise analysis of risk.

The vehicle history score 200 can be generated using a vehicle score generator 225 by an insurance company, or by a third party provider, including a vehicle history data providers (e.g., Experian, Carfax, or other vehicle history provider), or any party having access to vehicle history data 22. The company that owns and/or operates the vehicle score generator 225 could maintain and keep a database of vehicle historical events, or that company could make arrangements with another to supply vehicle history data 22 on demand. Many other possible business arrangements are possible. Similar to the needs associated with the modeling computer 10 discussed above, due to the volume of vehicle scores to be processed, the amount and complexity of the vehicle history data 22, and the need for timely information when considering a customer request for insurance (or quote for insurance), a computerized vehicle score generator 225 is necessary to rapidly receive, process the large volume of information and data, and generate the vehicle history score 200.

Referring to FIG. 1, depending on the desired configuration, the vehicle score generator 225 may reside on the customer computer systems 40, the vehicle history data system 112, or some third party system (not depicted). Additionally, referring to FIG. 5, the vehicle score generator 225 may reside on the modeling computer 10. It should be understood that depending on the configuration of the systems, and the party conducting the original modeling, that the modeling computer 10 may also be part of the customer computer systems 40. The vehicle score generator 225 can be embodied in the necessary hardware and software to perform the functions below, including obtaining and/or extracting the necessary vehicle history data 22, and generating a vehicle history score 200. The vehicle score generator 225 may generate a score based on vehicle history data 22 (e.g., a vehicle history score 200), or based on vehicle history data 22 together with other variables 42 (e.g., traditional insurance factors), referred to herein as a composite vehicle score 250. Composite vehicle score 250 can also be segregated into buckets or groupings as discussed above. Thus, for the purposes of underwriting and/or rating a vehicle may have a vehicle history score 200, as well as a composite vehicle score 250.

Figure 6:
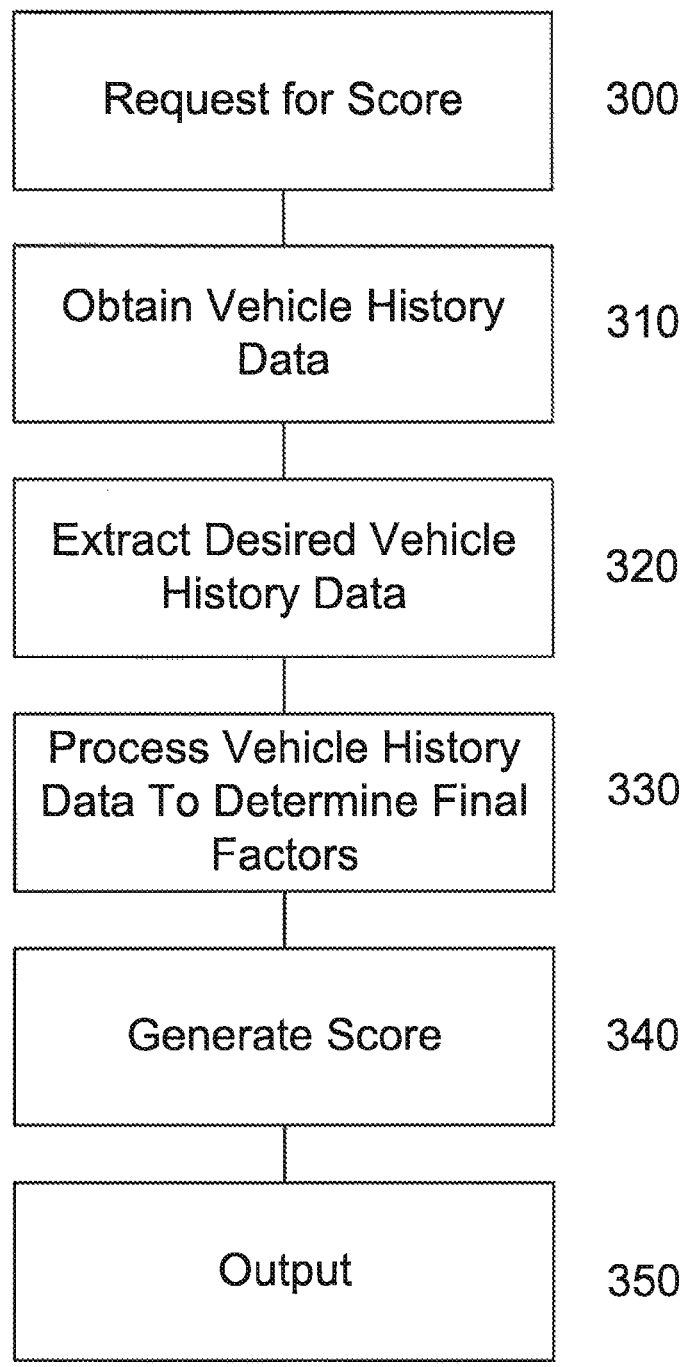
FIG. 6 is a flowchart showing the steps in creating and outputting a vehicle score in accordance with one embodiment of the invention.

Depicted in FIG. 6 is one embodiment of how the present invention can be implemented. In step 300, the vehicle score generator 225 receives a request 70 for vehicle history score 200. This is typically handled by submitting a particular VIN, or multiple VINs. In step 310, the vehicle score generator obtains the appropriate vehicle history data 22, related to that VIN. In step 320, the desired subset of vehicle history data 22 is extracted from the larger data set. For example, an insurance company may decide that not all of the available data is necessary to generate a vehicle history score 200 for their specific use. In such a case, the subset is filtered out from the vehicle history data 22 prior to being processed. In step 330, the remaining vehicle history data 22 is further processed to determine the final factors for the desired vehicle variables 44. In step 340, a final value or vehicle history score 200 is generated. In step 350, the result is output to the user. It should be understood to those of skill in the art that not all steps may be necessary depending on the configuration of the computer systems, and databases utilized herein. For example, when the vehicle data history 22 is obtained, it could be provided in a format that has already removed the unwanted or unnecessary data. As discussed above, an additional step can be performed to further combine the vehicle history score 200 with other traditional insurance factors to create a composite vehicle score 250. Either the vehicle history score 200 or the composite vehicle score 250 can be used to underwrite and/or rate insurance for vehicles.

It should be further recognized that vehicle score generator 225 may also reside on the computer systems of third party providers. In certain situations, a particular insurance company may not desire to have the vehicle score generator 225 on its computer systems. In that situation, the customer computer systems 40 may communicate with the third party providers systems, and the third party provider's systems may be in communication with the vehicle history data system. An example of this embodiment is set forth in FIG. 7. In this embodiment, the request for score step 300 in FIG. 6 may originate from the customer, steps 310, 320, 330, and 340 may be performed by the third party provider, and the score delivered to the customer. In this embodiment, the insurance company may further combine the vehicle history score 200 with other traditional insurance factors to create a composite vehicle score 250, and use such score to underwrite and/or rate insurance.

As discussed above, vehicle history scores 200 (and composite vehicle scores 250) can be allocated to a particular grouping, or bucket. In one embodiment, an insurance company may use the vehicle history score 200, and its grouping, directly for underwriting and/or rating consideration. Thus, utilizing the vehicle history data 22 alone, an insurance company may decide not to insure any vehicle with a vehicle score 200 over some threshold (for example, 2.00), and price vehicles with particular vehicle scores 200 at certain levels relative to what it would charge without considering the vehicle history data 200 (for example, vehicles have a score ranging from 1.70-1.99 at 200% its normal rate based on its traditional insurance factors 20, vehicles ranging from 1.50-1.69 at 175% the normal rate, etc.).

In addition to vehicle history score 200 groupings, it is also possible to use other variables 42 or different weightings for different categories or sub-categories that apply different modeling sub-routines. For example, during the variable creation and research database analysis discussed above, it may be determined that a particular vehicle variable 44 has a different impact on potential loss in different categories. For example, as part of the testing and analysis, it may be determined that frame damage in a vehicle used by a young driver has a different risk than frame damage in a vehicle used by an older driver. Thus, an insurance company may want different categories and/or sub-categories for different groupings of information. Possible categories include cars v. trucks, old drivers v. young drivers, etc. Dividing the analysis into sub-categories can produce models custom fit to that sub-category, and that custom fit model may more accurately predict risk than a general one-size-fits-all model. The insurance company could then divide potential customers based on the sub-categories with the most accurate models, and thereby better predict the risk for that customer. The sub-categories can be based on VHR event codes 15, or traditional insurance factors 20, combinations of VHR event codes 15 and traditional insurance factors 20, or any division that improves accuracy. This can provide multiple sub-routines for risk evaluation.

One way to evaluate possible useful sub-categories is to select the sub-categories based on different model types. For example, the sub-categories can be based on insurance rating policy level characteristics, which are characteristics of the policy. Examples of insurance rating policy level characteristics include (i) the total number of vehicles on a policy, (ii) the total number of drivers on a policy, and (iii) the policy payment option selected. Alternatively, the sub-categories can be based on vehicle level characteristics, which are characteristics of the vehicle. Examples of vehicle level characteristics include (a) cars v. trucks, (b) compact cars v. full size sedans, and (c) older model cars v. newer model cars. Another option is to select sub-categories based on driver level characteristics, which are characteristics of the driver. Examples of driver level characteristics include (1) driver age, (2) driver gender, and (3) driver traffic violation history.

The use of sub-categories is a way to customize a model to selected criteria. The selected criteria can be insurance factors 48, or it could be VHR event codes 38, or any grouping or combinations of criteria that results in a more accurate model. The model for different sub-categories can utilize different variables 42, because a variable 42 that helps predict risk for one sub-category may not predict risk for another. For example, a bent frame may not accurately predict risk for drivers over sixty, but it may be improve the accuracy of risk predictions for teen age drivers. Alternatively, the same variable 42 may have different significance for different sub-categories, so the weight given to that variable 42 could change in the model used for each sub-category. In other words, this is a method of filtering, or routing, a risk to one of multiple models created to more precisely fit that risk than can be done by a single model. The "filter" can be a policy, driver, or vehicle level filter.

Figure 7:
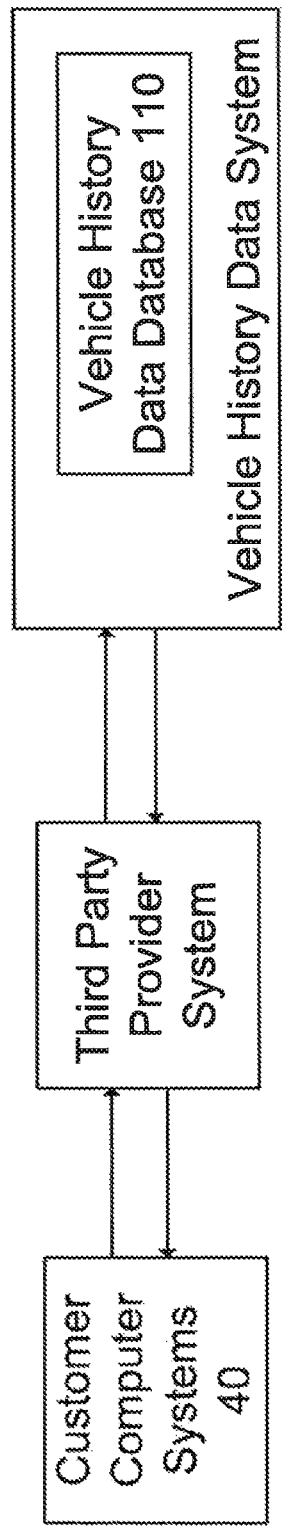
FIG. 7 is a schematic of the relationship among various parties using one embodiment of the invention.
Figure 8:
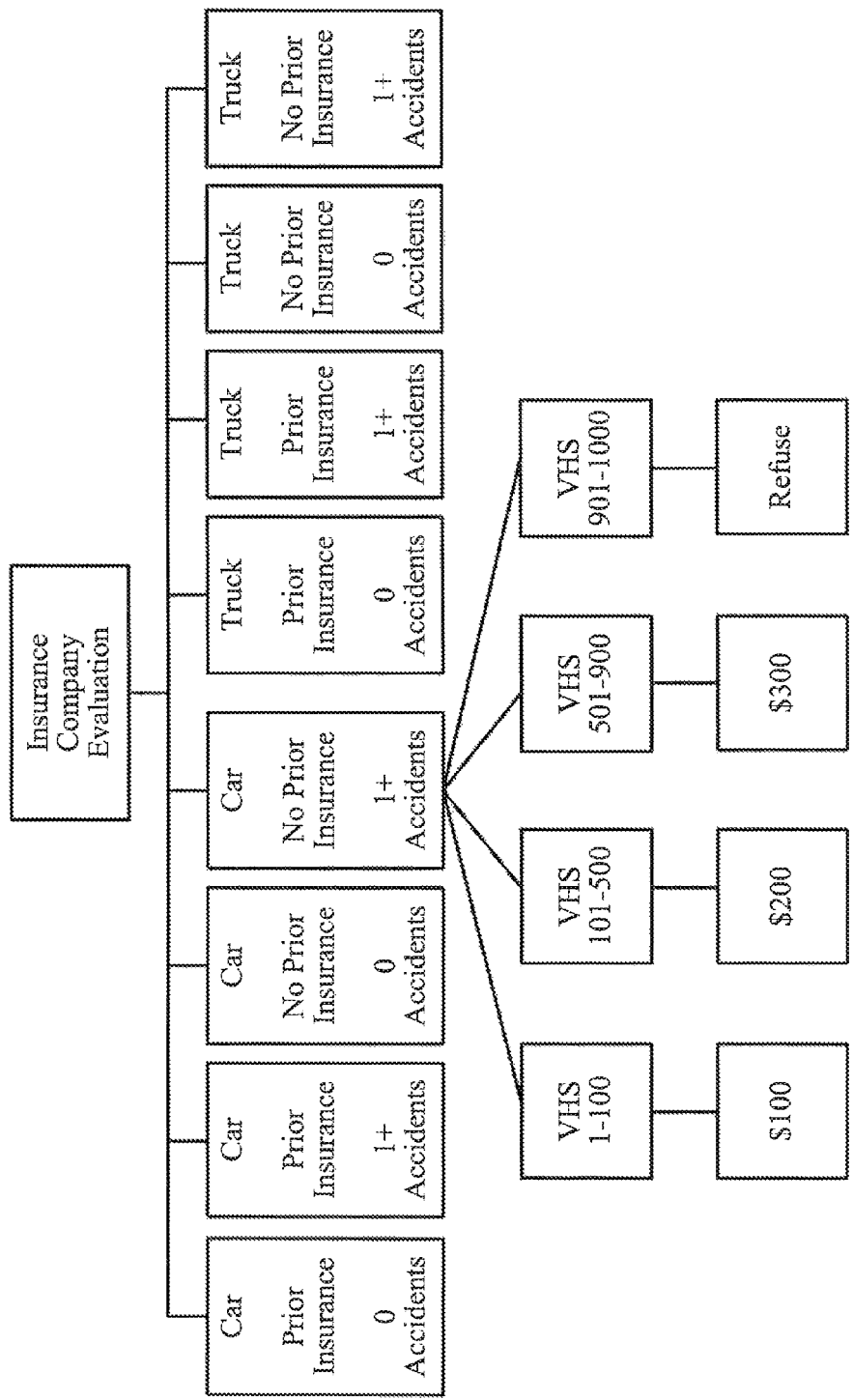
FIG. 8 is a schematic of different sub-categories of insurance categories in one embodiment of the invention.

As one example, an insurance company may separate, or filter, potential customers into one of a number of categories, or sub-categories, depending on the nature of the potential customer. For example, a particular insurance company may first filter all of its potential customers based on the traditional insurance factors 20 of truck v. car, prior insurance v. no prior insurance, and no accidents v. 1 or more accidents. Referring now to FIG. 8, in this embodiment, each potential customer is filtered into one of the 8 alternative categories, depending on the characteristics of that potential customer. Each category may have its own vehicle history score 200 algorithm, and the vehicle history score 200 algorithm in different categories may utilize the same or different vehicle variables 44. FIG. 7 is just illustrative of the concept, and there can obviously be additional traditional insurance factors 20 that can be considered, and there can be hundreds of different categories, and sub-categories. Each category may have its own final factors 52. For example, for customers that have a car, no insurance, and one or more accidents, the final factors 52 may be higher than the final factors 52 for a car, with prior insurance, and no accidents. Once potential customers are filtered into the various categories, and a vehicle history score 200 generated, the insurance company may utilize that vehicle history score 200 as described herein. In the example shown in FIG. 7 (depicted for only one category), the vehicle history score 200 (abbreviated as VHS in FIG. 7) is converted to a scale of 1-1000, and depending on the vehicle history score 200, the price of policy, or the willingness of the insurance company to underwrite the policy, determined.

A plurality of vehicle variables 44 are populated once the preliminary data is gathered and input into the computer 10. Various factors can be evaluated to determine which vehicle variables 44 to populate. In general, the factors that indicate a sub-routine provides a better risk prediction for a particular group or sub-group are used to select a desired scoring sub-routine 74. Standard variables 46 may also be populated and utilized in some embodiments. If no factors indicate a more accurate sub-routine, or if a single program is developed to predict risk, then the scoring program 72 utilizes the available program to predict risk and no selection process is necessary.

In some embodiments, the selection of different scoring sub-routines 74 proceeds throughout the process. One particular scoring sub-routine 74 can include nested scoring sub-routines 74 to increase the risk prediction accuracy. For example, one scoring sub-routine 74 may be implicated for teen age drivers, and the appropriate vehicle variables 44 for teen age drivers may vary for males and females. Therefore, the scoring sub-routine 74 for teen age drivers is further divided into separate scoring sub-routines for teen age male drivers and teen age female drivers.

Some scoring sub-routines 74 may be dependent on preliminary calculations in the scoring program 72. For example, the significance of the vehicle being a sports car may depend on the level of risk calculated from other variables 42. A sports car may be particularly dangerous for a risky driver, but there may not be any appreciable increase in risk for a conservative driver. In this example, the selection of the scoring sub-routine 74 could depend on previous results from the overall scoring program 72.

The scoring program 72 will use the data entered to generate a final score. This final score can be generated in various ways. For example, the scoring program may use one scoring sub-routine to generate a frequency score 62, and a separate scoring sub-routine to generate a severity score 64. The frequency and severity scores 62, 64 may or may not be combined into an overall vehicle score 40. Alternatively, the scoring program 72 may generate a single vehicle score 40 without separate frequency and severity scores 62, 64, or the scoring program 72 may generate different levels of scores for different scoring sub-routines 74. The scoring program 72 may generate a single vehicle score 40 for some scoring sub-routines 74, but also generate separate frequency and severity scores 62, 64 for other scoring sub-routines 74.

In some embodiments, the scoring program 72 determines which vehicle variables 44 to populate, which standard variables 46 to populate, which scoring sub-routines 74 to utilize, and a weighting factor 52 for each variable 42 utilized in generating the final score. The scoring program 72 determines which VHR event codes 38 to access, which VHR event codes 38 to ignore, and how to extract the date from the VHR to populate the vehicle variables 44. The scoring program 72 also determines if any enhanced vehicle variables 50 will be used, and how those enhanced vehicle variables 50 will be populated and weighted.

The scoring program 72 also determines how the final score will be output. The final score can be a single vehicle score 40, separate frequency and severity scores 62, 64, or all three scores 40, 62, 64. The scoring program 72 may also determine how to weight the frequency and severity scores 62, 64 when generating an overall vehicle score 40.

In some embodiments, the scoring program 72 utilizes a generalized linear modeling approach to predict the risk. Generalized linear models yield variable values which 42 are all multiplied together to give a score. The variables 42 can be weighted when multiplied together to improve accuracy. This type of computational method allows for some variables 42 to lower the overall score, while others increase the score. Any variable 42 with a value of zero is not included to prevent multiplying by zero. Alternatively, the scoring program 72 can utilize simple regression modeling to calculate the score. Simple regression modeling provides several variables 42 that are then added together. The variables 42 added together are typically weighted before being added together. Each positive variable increase the overall score, so lowering the score for factors that reduce risk can be complicated.

In the practical application, an insurance company may either generate its own vehicle history score 200 or obtain that from a third party provider. Once that score is obtained, it may incorporate that into its own pricing and underwriting processes. As discussed above, an insurance company may decide that a vehicle with a vehicle score over some threshold is not insured at all. Alternatively, it may determine that a particular vehicle history score 200 is adjusted and incorporated into its exists underwriting and rating processes. For example, if an insurance company currently takes into account the age, sex, vehicle type, and amount of traffic violations of an insurance applicant, it may add a new rating variable to account for vehicle history score 200. Thus, for some particular applicant, it may use a multiplicative rating model of age variable*sex variable*vehicle type variable*traffic violations variable=rate or premium charged, it can now include a vehicle score rating variable in the multiplicative equation (with the score converted to a multiplier as discussed above). For example, a vehicle history score 200 of 1-100 may use a rating multiplier of 1.00, a score of 101-200 may use a rating multiplier of 1.05, etc. Alternatively, if a vehicle history score 200 is obtained, an insurance company may determine that particular coverages or options are not available to a particular customer. For example, if a vehicle history score 200 is over some threshold, the insurance company may determine that physical damage coverage will not be available because the vehicle is very likely to incur excessive physical damage loss costs. Additionally, if a vehicle history score 200 is over some threshold, the insurance company may determine that it will not issue bodily injury liability coverage, or if it does, it will only issue it at some lower limit amount, for example, $15,000/$25,000. Thus, in this context, an insurance company may use a vehicle history score 200 as a direct multiplier it its existing modeling (as converted to the appropriate multiplier), or as a filter to determine that certain products or options are or are not available to a potential customer.

The computer output 18 sends the score using any appropriate method, such as a display on a monitor, or by e-mail, text messaging, data exchange between computers, or any other method desired. The results can include other factors besides the vehicle, frequency, and severity scores 40, 62, 64, if desired. For example, some insurance companies may have different risk calculation models that utilize specific VHR event codes 38, so those desired VHR event codes 38 can be included in the results. In a similar manner, the results can include any factor, variable 42, or other detail that may be beneficial to the insurance company. In some embodiments, the insurance company may want the results as simple as possible, so only a vehicle score 40 is provided. However, knowledge of the frequency and severity scores 62, 64 may provide more insight into the risks. The results can be customized for different customers, so more data is provided to one insurance company and less data is provided to another.

An insurance company can use the risk evaluation based on the VHR in several ways. It can be used to help determine whether to issue a policy 30 at all, or which product or program to issue the policy in, or to price a policy 30 that is issued. In some embodiments, an insurance company will start with a base rate and multiply it by various risk factors to increase or lower the rate as appropriate. The VHR risk data can influence the risk factors used to adjust the base rate. VHR data can also be used to evaluate fraud and claims handling. For example, risk data can be used to help determine the level of scrutiny applied when suspicious claims are reviewed.

Not only can VHR risk data and analysis be used to evaluate risk associated with both liability and physical damage auto insurance coverage, but the results may also be customized for different purposes. For example, a more accurate estimation of risk can be valuable for financing loans or for warranty offerings for vehicles, or even for evaluating the need for auto repairs. For financing analysis, a financing company may offer higher interest rate loans for vehicles having a higher vehicle history score, not finance certain vehicles over a certain vehicle history score, or adjust the amount it is willing to finance because of the expected true value of the vehicle based on the vehicle history score 200. The impact of the vehicle history on the expected risk related to vehicle financing can be determined as discussed above.

Similarly, if the vehicle history is being used in connection with vehicle warranty coverage, a warranty company may choose not to cover a certain vehicle if its vehicle history score 200 is over a threshold, or it may limit its total liability for lossto some threshold for vehicles with a certain vehicle history score 200.

The VHR risk evaluation can be used to help with liability policies 30 which cover such things as bodily injury, medical payments, and lost wages. This is particularly important since these losses have a high incidence of fraud. In such a case, a VHR risk evaluation may be used to alert the insurance provider to a possibility of such fraud. VHR risk evaluation can also be used to assess and price for predicted losses other than those that just involve vehicle repair. Examples of this include losses where the vehicle cannot be recovered (i.e. some thefts or flood loss) or where the damage to the vehicle is more expensive to repair than the vehicle is worth. In these cases he insurance company may opt to take possession of the vehicle and simply compensate the insured for the value of the vehicle immediately prior to the loss event (i.e. a "total loss"). VHR modeling has been found beneficial for predicting future vehicle repair costs as well as both liability and physical damage coverage losses that do not involve vehicle repair. The risk evaluation process described above can be customized to provide information tailored for different uses, so different scoring programs 72 may be used to model risk for liability insurance perils (i.e. bodily injury, property damage, personal injury protection, uninsured/underinsured motorist bodily injury, uninsured motorist property damage, etc.) as well as physical damage insurance perils (i.e. comprehensive, collision etc.). Additionally, the risk evaluation may be used to model risk for other insurance coverage such as homeowner's coverage. Additional possible modeling and risk evaluation uses for VHR include retention, premium, lifetime value, marketing, and expense ratio applications as well.

CONCLUSION

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:
1. A method of determining risk for a vehicle comprising:
a.) obtaining vehicle history data for the vehicle from a computerized vehicle history database based on the vehicle's vehicle identification number (V1N);
b.) selecting at least two vehicle variables determined to impact the risk of future loss associated with a vehicle, where at least one of the selected vehicle variable has a plurality of time dependent risk levels that are each associated with a different predetermined timeframe period for the selected vehicle variable;
c.) assigning numerically weighted values to vehicle variables and the plurality of time dependent risk levels associated with different predetermined timeframe periods for the selected vehicle variable;
d.) storing the selected vehicle variables, time dependent risk levels, and numerically weighted values in an electronic non-transitory memory storage media;
e.) analyzing the vehicle history data with a users computer system to determine the applicability of (i) the selected vehicle variables, and (ii) the time dependent risk levels associated with different predetermined timeframe periods; and f.) generating a risk score for the vehicle based on the applicability of the selected vehicle variables, the plurality of time dependent risk levels and the numerically weighted assigned values.

2. The method of claim 1, where the vehicle history data comprises vehicle event codes and event code dates.

3. The method of claim 1, where the vehicle history data comprises odometer readings and odometer reading dates.

4. The method of claim 1, where the vehicle history data comprises vehicle event codes, event code dates, odometer readings, and odometer reading dates.

5. The method of claim 1, where the timeframe period of the specific time dependent risk levels is based on the age of the vehicle.

6. The method of claim 2, where the timeframe period of the specific dependent risk levels is based on the time that has passed since one or more event code dates.

7. The method of claim 3, where the timeframe period of the specific dependent risk levels is based on the time that has passed since one or more odometer reading dates.

8. The method of claim 1, where the risk score is adjusted based on traditional insurance factors.

9. The method of claim 8, where tire traditional insurance factors comprise demographic information of a driver on the vehicle.

10. The method of claim 8, where the traditional insurance factors comprise the age of the vehicle.

11. The method of claim 1, where the risk score is scaled to represent tire relative risk of the vehicle.

12. The method of claim 1, where the risk score is transmitted to an insurance provider for use in rating an Insurance policy.

13. The method of claim 1, where the scaled risk score is transmitted to an insurance provider for use in deciding to underwrite an insurance policy.

14. The method of claim 1, where the vehicle variables comprise failed inspection, fleet designation, minor accident, odometer readings, time since most recent odometer reading, salvage, scrap, theft, and average length of time of vehicle ownership.

15. The method of claim 1, where the risk score is generated using a generalized linear model (GLM) method.

16. The method of claim 1, where the vehicle time dependent risk levels comprise, failed vehicle inspection, fleet ownership, minor accident, odometer reading, time of last odometer reading, rental ownership, repossession, salvage, scrap, severe accident, theft, and title length of present ownership.

17. A method of determining insurance risk for a vehicle comprising:
a.) storing numerically weighted values associated with one of more vehicle variables relative to other vehicle variables in an electronic non-transitory memory storage media,
   i.) where selected vehicle variables are further categorized into multiple vehicle variable levels,
   ii.) where the multiple vehicle variable levels are associated with a singular event occurrence which occurs within different time periods,
   iii.) where each vehicle variable level has its own numerically weighted value;
b.) obtaining vehicle history data for a specific vehicle from a searchable computerized database, where the vehicle history data for the specific vehicle is identified by a vehicle identification number (VIN), and storing the vehicle history data in an electronic non-transitory memory storage media;
c.) analyzing in a computerized vehicle score generator, the vehicle history data to determine the applicability of one or more vehicle variables and selected vehicle variables having vehicle variable levels associated with a singular event occurrence for applicability to vehicle loss risk;
d.) assigning the stored numerically weighted values associated with the vehicle variables and selected vehicle variables having vehicle variable levels associated with a singular event occurrence based on results of the analysis of c.); and
e.) generating with a computerized risk score generator, a risk score for a vehicle based on the assigned numerically weighted values associated with the vehicle variables and selected vehicle variables have vehicle variable levels associated with a singular event occurrence.

18. The method of claim 17, where the time periods for the vehicle variable levels are based on the age of the vehicle.

19. The method of claim 17, where the time periods for the vehicle variable levels are based on the time since the occurrence of the singular event occurrence associated with the selected vehicle variable.

\* \* \* \* \*